United States Patent
Hsu

(10) Patent No.: US 9,798,511 B2
(45) Date of Patent: Oct. 24, 2017

(54) AUDIO DATA TRANSMITTING METHOD AND DATA TRANSMITTING SYSTEM

(71) Applicant: MEDIATEK INC., Hsin-Chu (TW)

(72) Inventor: Pei-Lin Hsu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 8 days.

(21) Appl. No.: 14/809,283

(22) Filed: Jul. 27, 2015

(65) Prior Publication Data

US 2016/0125886 A1 May 5, 2016

Related U.S. Application Data

(60) Provisional application No. 62/069,956, filed on Oct. 29, 2014.

(51) Int. Cl.
*G10L 21/00* (2013.01)
*G06F 3/16* (2006.01)
*G10L 19/16* (2013.01)
*G10L 19/00* (2013.01)

(52) U.S. Cl.
CPC .............. *G06F 3/165* (2013.01); *G10L 19/16* (2013.01); *G10L 19/0017* (2013.01); *G10L 19/167* (2013.01)

(58) Field of Classification Search
CPC .............. A61K 2300/00; A61K 31/355; A61K 31/375; A61K 33/30; H04N 2201/328; H04N 5/85; H04N 9/8042; H04W 4/10; H04W 76/005; H04W 88/04; H04R 2420/01; H04R 2499/13; G11B 27/034; G11B 27/105; G11B 2220/2562
USPC .......... 704/500; 455/41.2; 370/473; 341/155; 386/259, 329; 375/240.16; 358/1.18; 369/273

See application file for complete search history.

(56) References Cited

U.S. PATENT DOCUMENTS

| 6,388,766 B1* | 5/2002 | Inoue ................... G07F 17/16 358/1.18 |
| 2011/0088056 A1 | 4/2011 | Ansari |
| 2012/0204213 A1 | 8/2012 | Lau |
| 2014/0179229 A1* | 6/2014 | Lin ....................... H04W 8/005 455/41.2 |

FOREIGN PATENT DOCUMENTS

| CN | 203104755 U | 7/2013 |
| CN | 103489450 A | 1/2014 |
| CN | 103533481 A | 1/2014 |

* cited by examiner

*Primary Examiner* — Charlotte M Baker
(74) *Attorney, Agent, or Firm* — Han IP Corporation; Andy M. Han

(57) ABSTRACT

An audio data transmitting method applied to an audio data transmitting device. The audio data transmitting method comprises: (a) receiving first audio data from at least one audio data source, wherein the first audio data follows a first audio format; and (b) outputting the first audio data from the audio data transmitting device without encoding or decoding the first audio data.

16 Claims, 8 Drawing Sheets

AUDIO DATA TRANSMITTING METHOD AND DATA TRANSMITTING SYSTEM

CROSS REFERENCE TO RELATED APPLICATIONS

This application claims the benefit of U.S. Provisional Application No. 62/069,956, filed on Oct. 29, 2014, the contents of which are incorporated herein by reference.

BACKGROUND

Conventionally, a portable electronic device such as a mobile phone or a tablet PC sometimes needs to transmit audio data (ex. music file) to an external electronic device such as a speaker or an earphone. By this way, the user can listen to the audio data with a better quality or with a louder volume, or listen to the audio data without disturbing other people.

FIG. 1 is a schematic diagram illustrating how a portable electronic device transmits audio data to an external electronic device. As illustrated in FIG. 1, the portable electronic device 101 comprises a decoder 105 and a transmitting interface 107. The decoder 105 receives audio data AD_a from the audio source AS. In this example, the audio data AD_a follows an audio format MP3 (MPEG-1 Audio Layer-3) or AAC (Advanced Audio Coding). The decoder 105 decodes the audio data AD_a to generate the audio data AD_b, which follows an audio format PCM (Pulse-code modulation), such that the audio data AD_b can be mixed with other audio data.

After that, the transmitting interface 107 encodes the audio data AD_b again to generate the audio data AD_c, which follows the audio standard AAC, SBC (sub-band coding), or aptX. By this way, the receiving interface 109 in the external electronic device 103 can receive the audio data AD_c. Also, the audio data AD_c is decoded by the decoder 111 in the external electronic device 103, thereby the audio data AD_d following the audio format PCM is generated. Finally, the external electronic device 103 plays the audio data AD_d.

However, the above-mentioned mechanism needs several encoding/decoding operations. For more detail, a decoding operation is needed between the audio data AD_a and AD_b, an encoding operation is needed between the audio data AD_b and AD_c, and another decoding operation is needed between the audio data AD_c and AD_d. Therefore, the quality of the audio data may decrease due to these encoding/decoding operations.

SUMMARY

Therefore, one objective of the present disclosure is to provide an audio data transmitting method that can decrease the amount of encoding/decoding.

Another objective of the present disclosure is to provide an audio data transmitting system that can decrease the amount of encoding/decoding.

One implementation of the present disclosure discloses an audio data transmitting method applied to an audio data transmitting device. The audio data transmitting method comprises: (a) receiving first audio data from at least one audio data source, wherein the first audio data follows a first audio format; and (b) outputting the first audio data from the audio data transmitting device without encoding or decoding the first audio data.

Another implementation of the present disclosure discloses an audio data transmitting device comprising: a transmitting interface, configured to receive first audio data from at least one audio data source, wherein the first audio data follows a first audio format; and a control unit, configured to control the transmitting interface to output the first audio data from the audio data transmitting device without encoding or decoding the first audio data.

In view of above-mentioned implementations, the audio data can be transmitted without decoding or encoding, and only one time of decoding/encoding is needed before the audio data is played. Further, the volume of the audio data can be adjusted even if the lossless mode is applied.

These and other objectives of the present disclosure will no doubt become obvious to those of ordinary skill in the art after reading the following detailed description of the implementation that is illustrated in the various figures and drawings.

DETAILED DESCRIPTION

Figure 1:
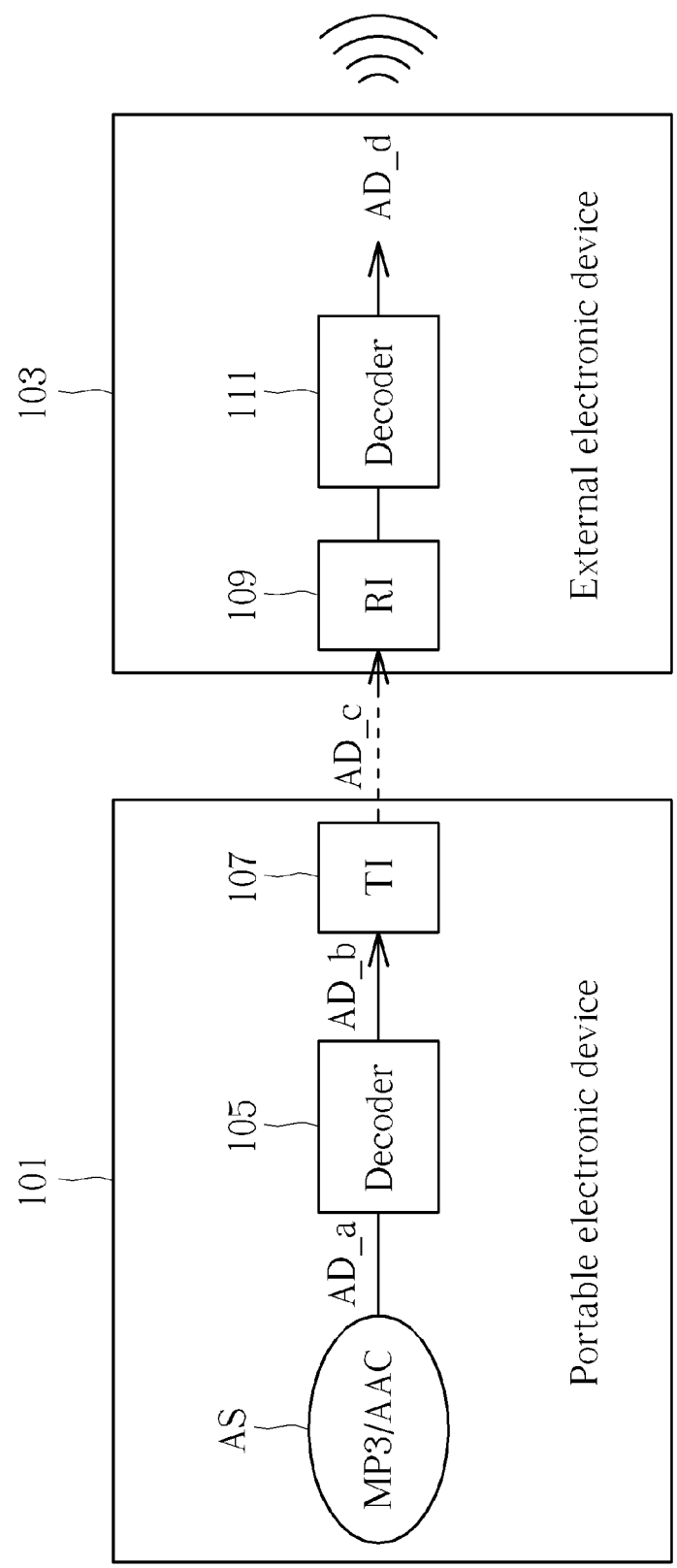
FIG. 1 is a schematic diagram illustrating how a portable electronic device transmitting audio data to an external electronic device.
Figure 2:
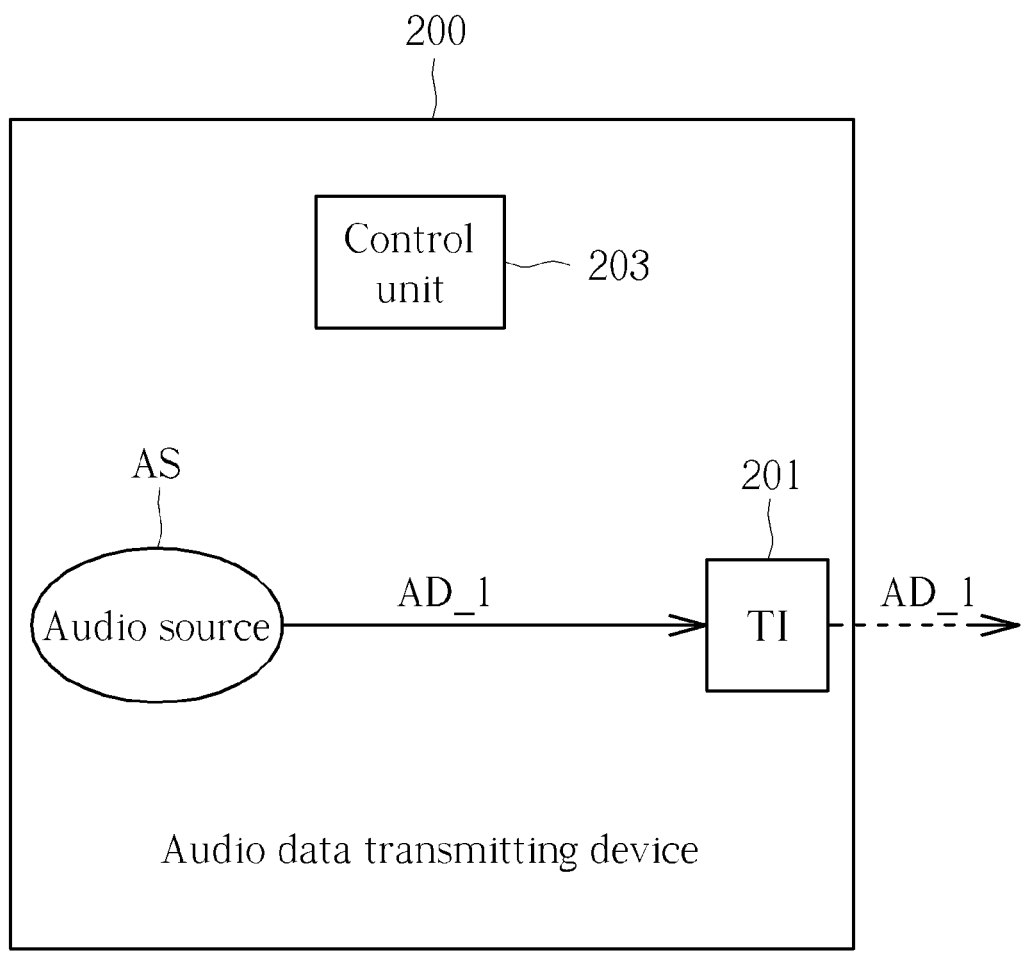
FIG. 2 is a block diagram illustrating an audio data transmitting device according to one implementation of the present disclosure.

FIG. 2 is a schematic diagram illustrating an audio data transmitting device according to one implementation of the present disclosure. As depicted in FIG. 2, the audio data transmitting device 200 comprises a transmitting interface TI 201. The audio data transmitting device 200 can be any portable or non-portable electronic device, for example, a mobile phone, a tablet PC, a laptop, or a PC. In one implementation, the audio data transmitting device 200 is a smart phone. In another implementation, the audio data transmitting device 200 is a smart phone applying an Android system. In the following implementation, a mobile phone is applied as the audio data transmitting device 200 to explain operations thereof.

The transmitting interface 201 can be, for example, a wireless transmitting interface such as a Bluetooth interface. However, other wireless transmitting interfaces or transmitting interfaces with wires can be applied as the transmitting interface for the present disclosure.

The transmitting interface 201 receives the first audio data AD_1 from at least one audio source AS. The audio source AS can be a source in the audio data transmitting device 200, for example, a storage device. However, the audio source AS can be a source outside the audio data transmitting device 200 as well, for example, a web site. The first audio data AD_1 follows a first audio format. In this implementation, the first audio format is one of MP3, AAC and FLAC, but not limited. After receiving the first audio data AD_1, the transmitting interface 201 outputs the first audio data AD_1 without encoding or decoding the first audio data AD_1.

Please refer to FIG. 2 again, the audio data transmitting device 200 comprises a control unit 203 (ex. a CPU) to control operations of the audio data transmitting device 200, such that the audio data transmitting device 200 can perform the operations described in the implementations of the present disclosure.

Figure 3:
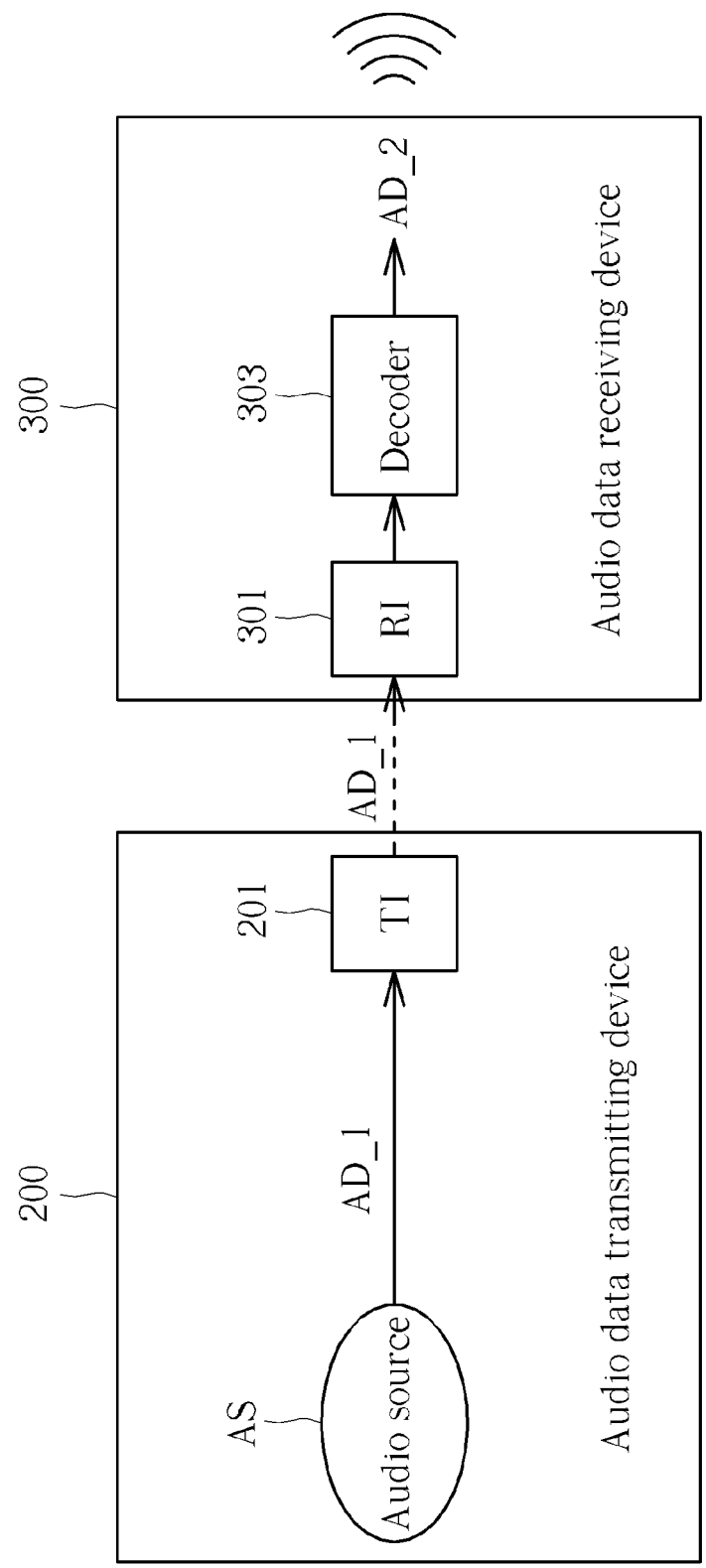
FIG. 3 is a schematic diagram illustrating the operation for an audio data receiving device receiving the audio data from the data transmitting device provided by the present disclosure.

FIG. 3 is a schematic diagram illustrating the operation for an audio data receiving device receiving the audio data from the data transmitting device provided by the present disclosure. In FIG. 3, an electronic system comprising the audio data transmitting device 200 and an audio data receiving device 300 is disclosed. As depicted in FIG. 3, the first audio data AD_1 is transmitted to an audio data receiving device 300 in FIG. 3. The audio data receiving device 300 can be any electronic device. In one implementation, the audio data receiving device 300 is an earphone or a speaker, but not limited.

As depicted in FIG. 3, the audio data receiving device 300 comprises a receiving interface (RI) 301 and a decoder 303. After the receiving interface 301 receives the first audio data AD_1, the decoder 303 decodes the first audio data AD_1 to generate the second audio data AD_2 following a second audio format. In one implementation, the second audio data AD_2 follows the audio format PCM, but not limited. Then, the second audio data AD_2 can be played by the audio data receiving device 300.

Figure 4:
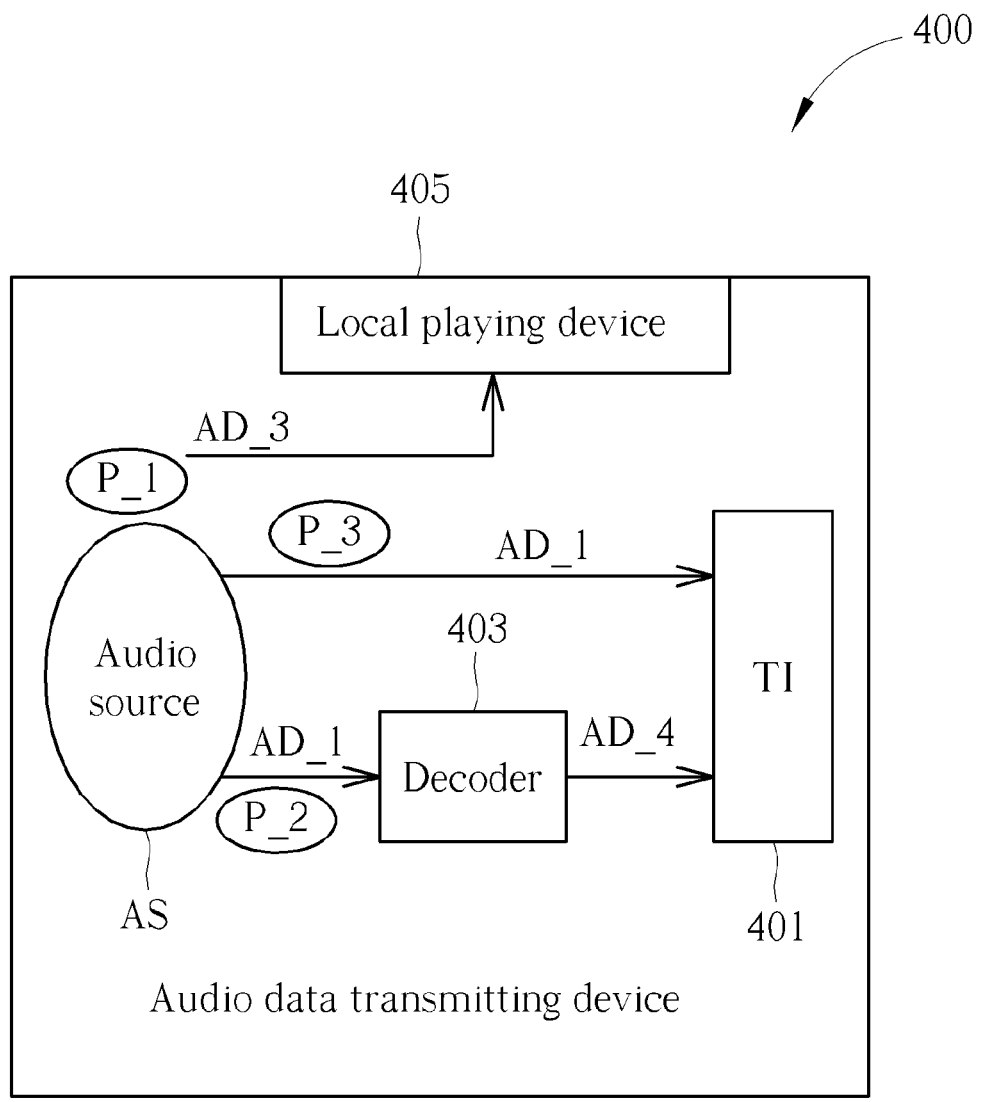
FIG. 4 is a block diagram illustrating an audio data transmitting device according to another implementation of the present disclosure.

Besides the path depicted in FIG. 2 and FIG. 3, the audio data transmitting device disclosed by the present disclosure can comprise other paths. FIG. 4 is a block diagram illustrating an audio data transmitting device according to another implementation of the present disclosure. In this implementation, the audio data transmitting device has a plurality of paths for audio data. As depicted in FIG. 4, the audio data transmitting device 400 comprises a transmitting interface (TI) 401, a decoder 403 and a local playing device 405. In such structure, the audio data transmitting device 400 comprises three paths. The first path P_1 is playing audio data via the local playing device 405. The second path P_2 is decoding the above-mentioned first audio data AD_1 to generate fourth audio data AD_4, and then outputs the fourth audio data AD_4 via the transmitting interface 401. The third path P_3 is the path already depicted in FIG. 2 and FIG. 3. That is, outputs the first audio data AD_1 without decoding or encoding it.

In one implementation, the third audio data AD_3 is audio data triggered by incoming events. For example, the audio data transmitting device 400 is a mobile phone and receives a call or message, and the third audio data AD_3 is a ring or a message notification generated by the audio data transmitting device 400. Also, in one implementation the third audio data AD_3 and the fourth audio data AD_4 follow the audio format PCM. Besides, the local playing device 405 is a device which is provided inside the audio data transmitting device 400 and can play audio data, for example, a speaker provided in the audio data transmitting device 400.

Figure 5:
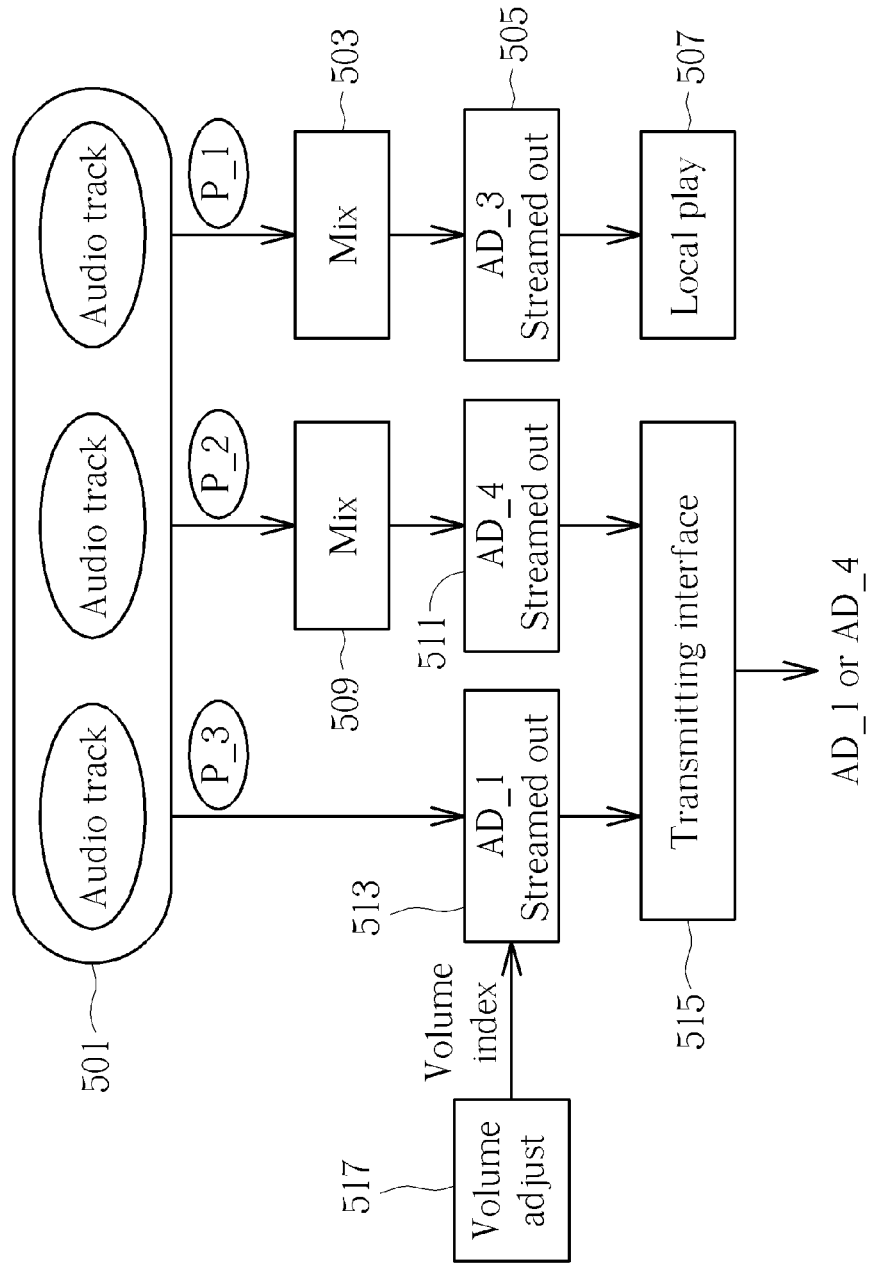
FIG. 5 is a schematic diagram illustrating detail operations for the audio data transmitting device depicted in FIG. 4.

FIG. 5 is a schematic diagram illustrating detail operations for the audio data transmitting device depicted in FIG. 4. As depicted in FIG. 5, the audio track in the step 501 indicates the audio data to be played. In path P_1, the audio track is mixed with other audio track in the step 503, if necessary. Please note the mix step can also be applied to adjust the volume of the audio track. In the step 505, the third audio data AD_3 is streamed out. Also, in the step 507, the third audio data AD_3 is played by the local play device (ex. 405 in FIG. 4).

For the second path P_2, the audio track is mixed in the step 509, if necessary. In the step 511, the fourth audio data AD_4 is streamed out. In the step 515, the transmitting interface outputs the audio data. For the third path P_3, in the step 513, the third audio data AD_3 is streamed out. In the step 515, the transmitting interface outputs the audio data. In one implementation, the transmitting interface has only one channel thus only one of the paths P_2, P_3 can be applied.

A volume of the first audio data AD_1 cannot be adjusted since a mix step is not included in the third path P_3, thus a volume adjust step 517 is further included in the third path P_3. A volume index is provided and transmitted to the audio data receiving device via the transmitting interface. After that, the audio data receiving device adjusts the second audio data (ex. AD_2 in FIG. 3) based on the volume index. The volume index can be generated by, for example, the control unit for the audio data transmitting device, but not limited.

Figure 6:
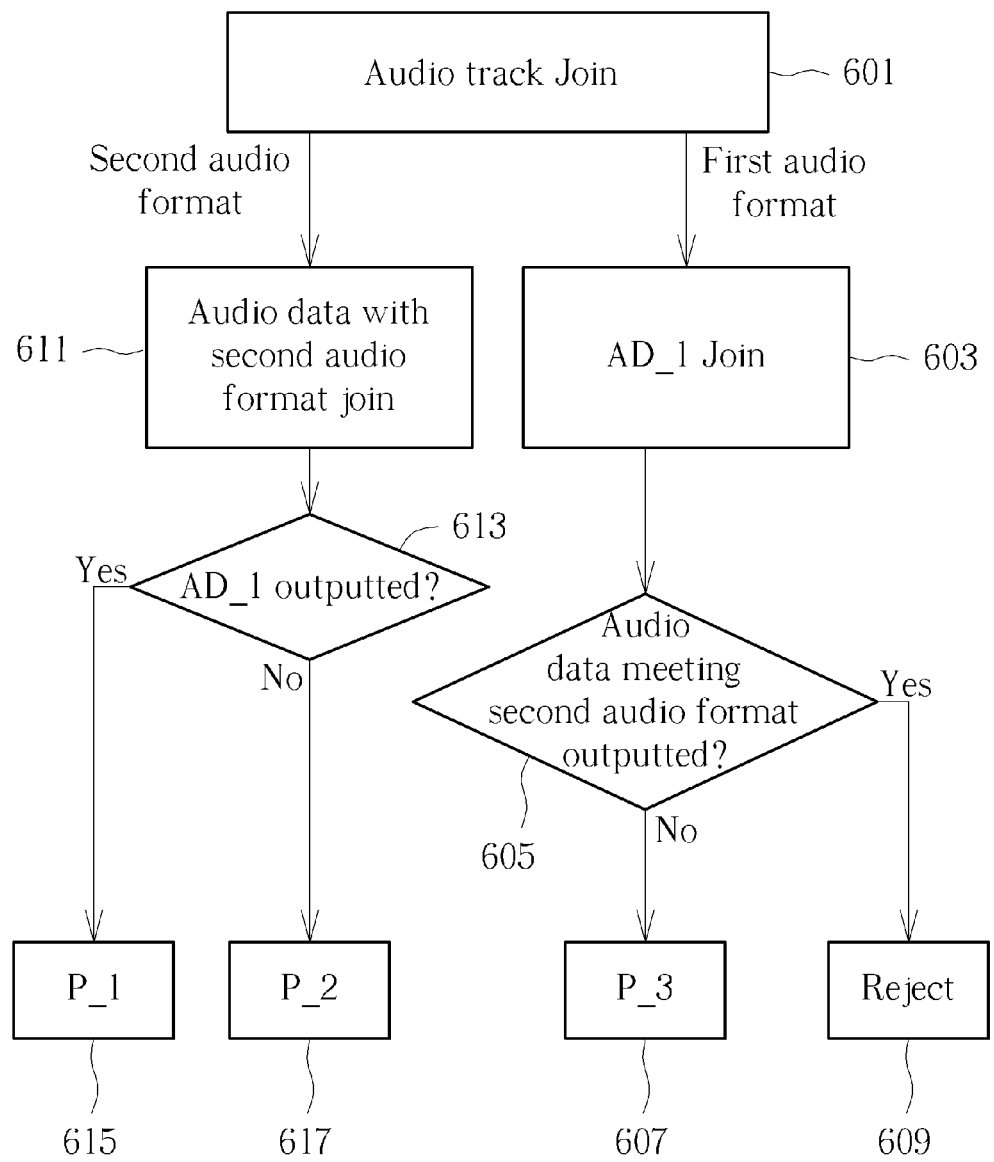
FIG. 6 is a schematic diagram illustrating a mechanism for determining a path for the audio data, according to one implementation of the present disclosure.

As above-mentioned, in one implementation the transmitting interface has only one channel. Therefore, a method for determining the path is provided in one implementation. FIG. 6 is a schematic diagram illustrating a mechanism for determining a path for outputting the audio data, according to one implementation of the present disclosure. FIG. 6 comprises the following steps:

Step 601

Audio track join. The determining flow starts when an audio object is created. If the audio track follows the first audio format, that is, the audio track is the first audio data AD_1, go to the step 603-609. On the contrary, if the audio track follows the second audio format, go to the steps 611-617.

Step 603

The first audio data AD_1 joins.

Step 605

Determining if the audio data following the second audio format is being outputted by the transmitting interface. If yes, go to step 609. If not, go to step 607.

Step 607

Output the first audio data AD_1 via the transmitting interface. That is, the third path P_3 in FIG. 5 is applied.

Step 609

Reject the first audio data AD_1, since the channel of the transmitting interface is already occupied.

Step 611

Audio data with second audio format joins. Such kind of audio data may be the third audio data AD_3 or the fourth audio data AD_4 depicted in FIG. 4.

Step 613

Determining if the first audio data AD_1 is being outputted by the transmitting interface. If yes, go to step 615. If not, go to step 617.

Step 615

Since the channel of the transmitting interface is already occupied, transmit the audio data with second audio format to the local playing device, that is, the first path P_1 in FIG. 5 is applied.

Step 617

Transmit the audio data with second audio format to the transmitting interface, that is, the second path P_2 in FIG. 5 is applied.

Figure 7:
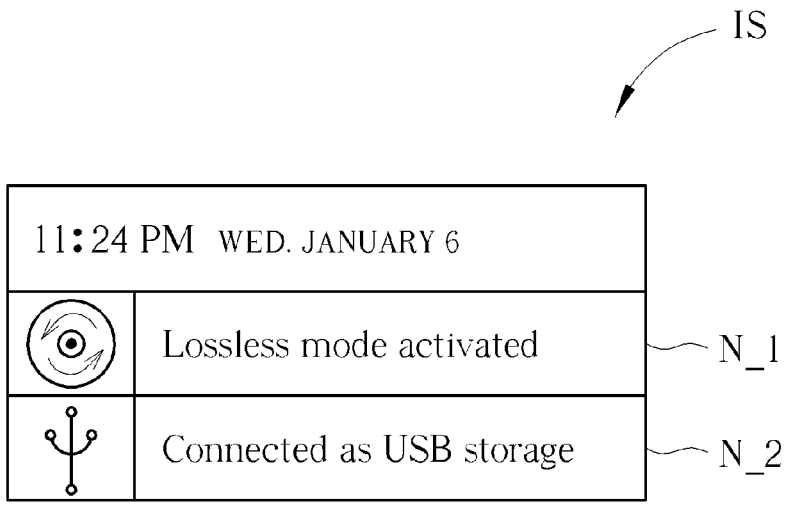
FIG. 7 is a schematic diagram illustrating an information screen showing that the lossless mode is activated.

In one implementation, the second path P_2 depicted in FIG. 4 and FIG. 5 is applied in a normal mode. The first path P_1 and the third path P_3 depicted in FIG. 4 and FIG. 5 are applied in a lossless mode. In the lossless mode, an information screen can be displayed by the data transmitting device to notify a user that the lossless mode is activated. FIG. 7 is a schematic diagram illustrating an information screen showing that the lossless mode is activated. As depicted in FIG. 7, the information screen IS displays a notification N_1 that the lossless mode is activated. The information screen IS can further comprise other notifications. For example, the information screen IS further displays a notification N_2 which informs a user that the audio data transmitting device is connected to an USB storage device.

Figure 8:
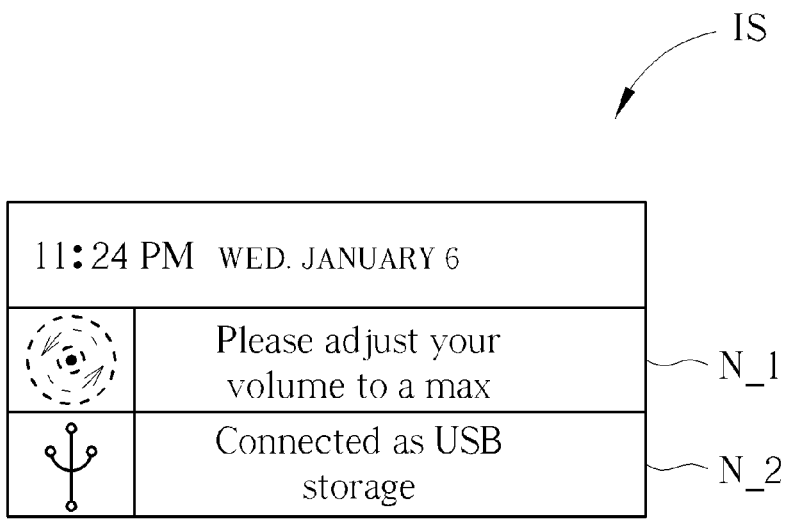
FIG. 8 is a schematic diagram illustrating an information screen showing that the volume of the audio data transmitting device should be adjusted.

As depicted in FIG. 5, a volume index (step 517) can be further provided to the audio data receiving device such that the audio data receiving device can adjust a volume of the audio data based on the volume index. However, some audio data receiving devices do not support the volume index thus cannot apply it. In such case, the volume of the audio data transmitting device must be adjusted to a predetermined volume (ex. a maximum volume), or the lossless mode will not be activated. For example, in FIG. 8 the information screen IS comprises a notification N_1 to inform a user that the volume of the audio data transmitting device must be adjusted to max. The lossless mode will not be activated until the volume is adjusted the maximum value. That is, the audio data transmitting device is controlled to operate in the normal mode or the lossless mode according to a relation between the volume and the predetermined volume.

In one implementation the predetermined volume is less than the max volume, and the audio data transmitting device operates in the normal mode if the volume is less or equals to the predetermined volume.

Also, the audio data transmitting device applies the second path P_2 (i.e. the normal mode) if the user adjusts the volume of the audio data transmitting device to a volume other than the predetermined volume. By this way, the user can still adjust the volume of the audio data he or she listens even if the audio data receiving device does not support the volume index. Further, since the volume of the first audio data is fixed at a constant value in the lossless mode, the volume of the audio data played by the audio data receiving device will not suddenly drop or increases.

Figure 9:
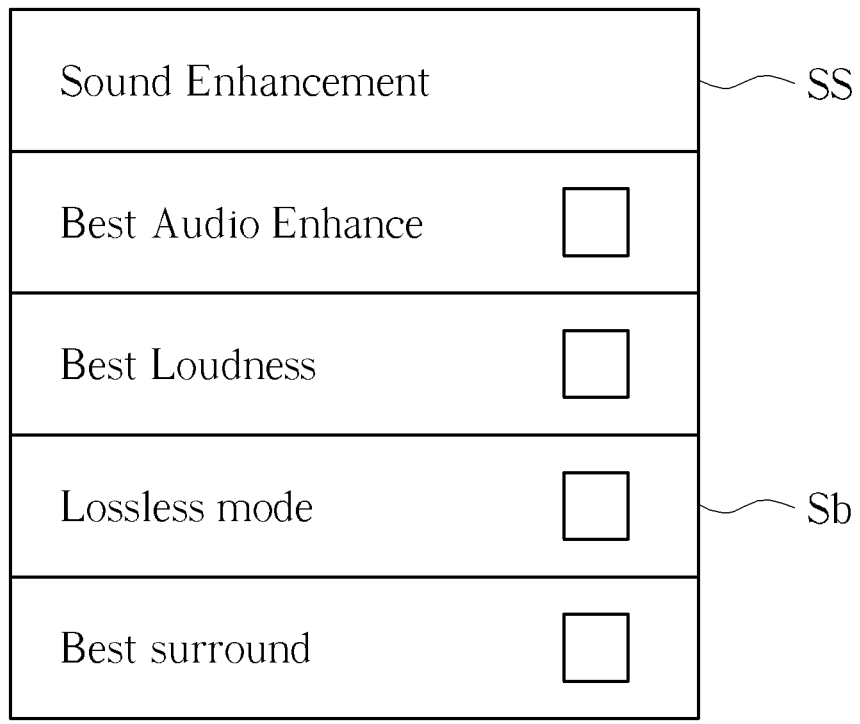
FIG. 9 is a schematic diagram illustrating a setting screen for selecting if the lossless mode should be activated or not.

In one implementation, the user can set if the lossless mode is activated or not via a setting screen. That is, the audio data transmitting device is controlled to operate in the lossless mode or the normal mode according to a user command. FIG. 9 is a schematic diagram illustrating a setting screen for selecting if the lossless mode should be activated or not. As depicted in FIG. 9, the audio data transmitting device displays a setting screen SS comprising a setting box Sb. The user can tick the setting box Sb to activate the lossless mode. In one implementation, if the data receiving device cannot support the lossless mode, that is, cannot support the audio format of the first audio data AD_1, the setting box Sb does not show up.

Please note, the losses mode can be activated by other mechanisms. For example, in one implementation, if the data receiving device does not support the above-mentioned volume index, the lossless mode cannot be triggered. In such implementation, a step for determining whether the audio data receiving device supports the volume index or not is performed. The lossless mode cannot be triggered if the audio data receiving device does not support the volume index. Also, the lossless mode can be triggered if the audio data receiving device does supports the volume index In view of above-mentioned implementations, an audio data transmitting method applied to an audio data transmitting device is acquired, which comprises the following steps: (a) receiving first audio data (ex. AD_1 in FIG. 2) from at least one audio data source, wherein the first audio data follows a first audio format; and (b) outputting the first audio data from the audio data transmitting device without encoding or decoding the first audio data.

Other detail steps can be acquired in view of above-mentioned implementations, thus are omitted for brevity here.

In view of above-mentioned implementations, the audio data can be transmitted without decoding or encoding, and only one time of decoding/encoding is needed before the audio data is played. Further, the volume of the audio data can be adjusted even if the lossless mode is applied.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A wireless audio data transmitting method, comprising:
   (a) receiving, by an audio data transmitting device, first audio data from at least one audio data source, wherein the first audio data follows a first audio format; and
   (b) wirelessly outputting, by the audio data transmitting device, the first audio data without encoding or decoding the first audio data,
   wherein the step (b) is performed in a lossless mode, wherein the audio data transmitting method further comprises:
      decoding the first audio data to generate fourth audio data via the audio data transmitting device in a normal mode, wherein the fourth audio data follows a second audio format; and
      outputting the fourth audio data from the audio data transmitting device in the normal mode.

2. The audio data transmitting method of claim 1, wherein the step (b) transmits the first audio data to an audio data receiving device comprising a decoder, wherein the audio data transmitting method further comprises:
   decoding the first audio data to second audio data via the decoder,
   wherein the second audio data follows a second audio format.

3. The audio data transmitting method of claim 2, further comprising:
   transmitting volume index from the audio data transmitting device to the audio data receiving device; and
   adjusting a volume of the second audio data according to the volume index.

4. The audio data transmitting method of claim 3, further comprising:
   determining whether the audio data receiving device supports the volume index or not;

wherein the step (b) is performed if the audio data receiving device supports the volume index;
wherein the step (b) is not performed if the audio data receiving device does not support the volume index.

5. The audio data transmitting method of claim 1, further comprising:
playing third audio data by the audio data transmitting device if the audio data transmitting device is controlled to output the third audio data while transmitting the first audio data,
wherein third audio data follows a second audio format.

6. The audio data transmitting method of claim 1, further comprising:
controlling the audio data transmitting device to operate in the lossless mode or the normal mode according to a user command.

7. The audio data transmitting method of claim 1, further comprising:
(c) determining a volume value of the audio data transmitting device; and
(d) controlling the audio data transmitting device to operate in the lossless mode or the normal mode according to the relation between the volume value and a predetermined volume.

8. The audio data transmitting method of claim 7, wherein the step (d) controls the audio data transmitting device to operate in the normal mode if the volume value is larger or equals to the predetermined volume.

9. A wireless audio data transmitting device comprising:
a transmitting interface, configured to receive first audio data from at least one audio data source, wherein the first audio data follows a first audio format; and
a control unit, configured to control the transmitting interface to wirelessly output the first audio data without encoding or decoding the first audio data,
wherein the control unit controls the transmitting interface to output the first audio data from the audio data transmitting device without encoding or decoding the first audio data in a lossless mode; wherein the audio data transmitting device further comprises a decoder configured to decode the first audio data to generate fourth audio data following a second audio format; wherein the control unit controls the transmitting interface to output the fourth audio data from the audio data transmitting device in the normal mode.

10. The audio data transmitting device of claim 9, wherein the control unit controls the audio data transmitting device to operate in the lossless mode or the normal mode according to a user command.

11. The audio data transmitting device of claim 9, wherein the control unit controls the audio data transmitting device to play third audio data if the audio data transmitting device is controlled to output the third audio data while transmitting the first audio data, wherein third audio data follows a second audio format.

12. An electronic system comprising:
a wireless audio data transmitting device comprising:
a transmitting interface, configured to receive first audio data from at least one audio data source, wherein the first audio data follows a first audio format; and
a control unit, configured to control the transmitting interface to wirelessly output the first audio data without encoding or decoding the first audio data; and
a wireless audio data receiving device, comprising a decoder configured to wirelessly receive the first audio data and configured to decode the first audio data to second audio data following a second audio format.

13. The audio data transmitting device of claim 12, wherein the control unit determines a volume value of the audio data transmitting device, controls the audio data transmitting device to operate in the lossless mode or the normal mode according to the relation between the volume value and a predetermined volume.

14. The electronic system of claim 13, wherein the control unit controls the audio data transmitting device to operate in the normal mode if the volume value is larger or equals to the predetermined volume.

15. The electronic system of claim 12, wherein the control unit generates volume index, and controls the transmitting interface to transmit the volume index from the audio data transmitting device to the audio data receiving device; wherein the data receiving device adjusts a volume of the second audio data according to the volume index.

16. The electronic system of claim 15, wherein the control unit further determines whether the audio data receiving device supports the volume index or not; wherein the control unit controls the transmitting interface to output the first audio data if the audio data receiving device supports the volume index; wherein the control unit does not control the transmitting interface to output the first audio data if the audio data receiving device does not support the volume index.

* * * * *